United States Patent
Bruet et al.

(10) Patent No.: US 12,041,522 B2
(45) Date of Patent: Jul. 16, 2024

(54) WIRELESS CONTROL METHOD AND DEVICE FOR ACTUATORS COUPLED TO A WIRED NETWORK

(71) Applicant: SOMFY ACTIVITES SA, Cluses (FR)

(72) Inventors: Etienne Bruet, Thyez (FR); Franck Beal, Chatillon sur Cluses (FR); Joel Thiebaut, La Roche sur Foron (FR)

(73) Assignee: SOMFY ACTIVITES SA, Cluses (FR)

( * ) Notice: Subject to any disclaimer, the term of this patent is extended or adjusted under 35 U.S.C. 154(b) by 274 days.

(21) Appl. No.: 17/627,656

(22) PCT Filed: Jun. 12, 2020

(86) PCT No.: PCT/FR2020/051003
§ 371 (c)(1),
(2) Date: Jan. 15, 2022

(87) PCT Pub. No.: WO2021/009423
PCT Pub. Date: Jan. 21, 2021

(65) Prior Publication Data
US 2022/0279327 A1    Sep. 1, 2022

(30) Foreign Application Priority Data
Jul. 15, 2019    (FR) ........................................ 1907984

(51) Int. Cl.
*H04W 4/00* (2018.01)
*G08C 17/02* (2006.01)
(Continued)

(52) U.S. Cl.
CPC .............. *H04W 4/80* (2018.02); *G08C 17/02* (2013.01); *H04W 4/029* (2018.02);
(Continued)

(58) Field of Classification Search
CPC ... H04W 4/80; H04W 52/0229; H04W 4/029; G08C 17/02; G08C 2201/12; G08C 2201/93
(Continued)

(56) References Cited

U.S. PATENT DOCUMENTS 10,593,174 B1 *   3/2020   Yoon ................... H04L 12/2816
10,841,382 B2 *   11/2020   Somaraju ................. H04W 4/70
(Continued)

FOREIGN PATENT DOCUMENTS

CN    109315051 A    2/2019
CN    109631102 A    4/2019
(Continued)

OTHER PUBLICATIONS

English Translation of International Search Report for International Application No. PCT/FR2020/051003; Date of Completion: Sep. 14, 2020; dated Sep. 28, 2020; 3 Pages.
(Continued)

*Primary Examiner* — Marceau Milord
(74) *Attorney, Agent, or Firm* — CANTOR COLBURN LLP

(57) ABSTRACT

Method for controlling an actuator connected via a wired network, the actuator including a first wired communication module, which is configured to communicate via the wired network, and a second wireless communication module, which is configured to be active or inactive, and a switch, the method comprising the following steps carried out by the actuator: activation of the second communication module triggered by the reception of a signal transmitted by an action on the switch or on another element of the wired network; transmission (EC102) by the actuator of an activity signal; —reception by the second communication module of a connection signal received from a third communication
(Continued)

module; establishment of a wireless connection to a mobile terminal; reception of a control signal by the at least one actuator from the mobile terminal.

10 Claims, 2 Drawing Sheets

(51) Int. Cl.
*H04W 4/029* (2018.01)
*H04W 4/80* (2018.01)
*H04W 52/02* (2009.01)

(52) U.S. Cl.
CPC .... *H04W 52/0229* (2013.01); *G08C 2201/12* (2013.01); *G08C 2201/93* (2013.01)

(58) Field of Classification Search
USPC ........................................................ 370/329
See application file for complete search history.

(56) References Cited

U.S. PATENT DOCUMENTS

| | | | |
|---|---|---|---|
| 11,255,663 B2* | 2/2022 | Binder | G01B 11/26 |
| 11,906,290 B2* | 2/2024 | Binder | G01S 17/08 |
| 2017/0215261 A1* | 7/2017 | Potucek | H05B 47/105 |
| 2017/0238401 A1* | 8/2017 | Sadwick | A61N 5/0618 |
| | | | 315/294 |
| 2018/0035518 A1 | 2/2018 | Cook | |
| 2018/0070431 A1* | 3/2018 | Charlton | H05B 45/30 |
| 2018/0254758 A1* | 9/2018 | Cheng | H03F 3/68 |
| 2018/0368237 A1* | 12/2018 | Gal | H05B 47/16 |
| 2019/0041842 A1* | 2/2019 | Cella | G05B 23/0264 |
| 2020/0274813 A1* | 8/2020 | Fargier | H04L 47/2458 |
| 2020/0319621 A1* | 10/2020 | Roy | G01L 19/086 |
| 2021/0006427 A1* | 1/2021 | Fargier | H04L 67/51 |

FOREIGN PATENT DOCUMENTS

| | | |
|---|---|---|
| WO | 03092335 A1 | 11/2003 |
| WO | 2017152417 A1 | 9/2017 |

OTHER PUBLICATIONS

International Search Report for International Application No. PCT/FR2020/051003; Date of Completion: Sep. 14, 2020; dated Sep. 28, 2020; 5 Pages.

Written Opinion for International Application No. PCT/FR2020/051003; International Filing Date: Jun. 12, 2020; dated Sep. 28, 2020; 9 Pages.

English Translation of Written Opinion for International Application No. PCT/FR2020/051003; International Filing Date: Jun. 12, 2020; dated Sep. 28, 2020; 6 Pages.

CNIPA Notification of the First Office Action for corresponding CN Application No. 202080051766.6; dated Oct. 28, 2023.

* cited by examiner

WIRELESS CONTROL METHOD AND DEVICE FOR ACTUATORS COUPLED TO A WIRED NETWORK

CROSS REFERENCE TO RELATED APPLICATIONS

This application is a National Stage of PCT Application No. PCT/FR2020/051003 filed on Jun. 12, 2020, which claims priority to French Patent Application No. 19/07984 filed on Jul. 15, 2019, the contents each of which are incorporated herein by reference thereto.

TECHNICAL FIELD

The present invention concerns a device for the remote control of an actuator for building mobile equipment such as a rolling shutter, shade or curtain.

BACKGROUND

It is known to use a control device comprising an emitter using a radio frequency to emit a control signal, and a receiver of said frequency configured to receive said control signal, and to process the data of the received signal to control an actuator and/or set a parameter of an actuator according to the data of the signal.

In particular, such a known control device allows carrying out the remote, wireless control and/or the remote, wireless setting of operating parameters of an actuator of building mobile equipment, in particular to open or close a door, a gate, a window, a shade, a multimedia projection screen or a ventilation hatch.

There are different types of wireless communication protocols which allows carrying out such a remote control, for example, protocols known under trademarks, for example Bluetooth® or Bluetooth® Low Energy (BLE). The wireless communication protocol can use radiofrequency or optical technology, such as Lifi.

A drawback of known wireless remote control devices based on open protocols such as Bluetooth® or BLE, is that they are not secure. These control devices are further based on an application freely accessible and downloadable from the internet on the remote-control device. Yet, in some applications, it is undesirable that any user could freely access some setting functions of an actuator. Indeed, an inappropriate use of some setting functions might then be the source of costly corrective maintenance interventions.

It is also known to use a wired network to transmit, in a secure manner, a control or setting signal to one or several receiver(s) each configured to receive said control signal, and to process the data of the received signal to control an actuator, or set one or several parameter(s) of an actuator, as a function of the signal data, the receiver(s) being connected to the wired network, the control signal being emitted over the wired network, in a secure manner, via an interface, a keyboard type one for example, connected to the wired network. For example, it is known to use an Ethernet or RS485 cable to constitute said wired network.

In some applications, the use of the secure wired network for controlling and/or setting the actuators requires physical access to the actuators, and even temporarily disconnecting the actuators from the wired network. On the other hand, the actuator control and setting wired network sometimes allows access to only some functions or to specific settings.

Hence, the technical problem to be solved is to allow specific access, and on demand, to setting functions, by facilitating interventions at the level of the actuators, whereas the usual control functions, intended for set actuators, are emitted and transmitted to the actuators via the wired network.

Hence, the invention aims at providing a solution to all or part of these problems.

BRIEF SUMMARY

To this end, the present invention concerns a method for controlling at least one actuator, the at least one actuator being connected via a wired network to a wired control unit configured to emit control, or setting, or wake-up signals intended for the at least one actuator, the at least one actuator comprising a first wired communication module, the first wired communication module being configured to communicate with the wired control unit via the wired network, the at least one actuator comprising a second wireless communication module, the second communication module being configured to be active or inactive, and a switch, connected to the second communication module, the method comprising the following steps implemented by the actuator:
  if the second communication module is inactive, activation of the second communication module triggered by the reception of a wake-up signal emitted following an action on the switch or on the wired control unit or on another element of the wired communication network, such as a configuration tool, provided with a network interface for its connection to the communication network and connected to the wired communication network,
  emission by the actuator of an activity signal;
  reception by the second communication module of a connection signal received from a third communication module of a mobile terminal;
  establishment of a wireless connection with the mobile terminal;
  reception of a signal for setting the at least one actuator originating from the mobile terminal.

According to one implementation, this aspect of the invention comprises one or more of the following features, alone or in a technically feasible combination.

According to one implementation, the action on the wired control unit is exerted directly on the wired control unit, or results from an action on another element of the wired communication network configured to communicate with the wired control unit.

According to these arrangements, it is possible to have wireless access to the individual settings of the at least one actuator, settings for which access is, originally, available exclusively from a wired configuration tool connected to the wired network.

According to one implementation, the method comprises a step of disconnecting the wireless connection, and a step of deactivating the second communication module, the deactivation preferably being triggered automatically after a predetermined time from the disconnection, or by the wired control unit, or by another element of the wired communication network configured to communicate with the wired control unit.

According to these arrangements, wireless access is limited to authorized users holding a mobile terminal configured to establish a wireless connection with the actuators and configured to activate the first communication module.

According to one aspect, the invention also concerns a method for controlling at least one actuator, the at least one actuator being connected via a wired network to a wired control unit configured to emit control or setting signals or wake-up signals intended for the at least one actuator, the at least one actuator comprising a first wired communication module, the first wired communication module being configured to communicate with the wired control unit via the wired network, the at least one actuator comprising a second wireless communication module, the second communication module being configured to be active or inactive, and a switch connected to the second communication module, the method comprising the following steps implemented by a mobile terminal comprising a third communication module, the third communication module being a wireless communication module:

reception, by the third communication module of the mobile terminal, of an activity signal emitted by the actuator whose the second communication module is active;

emission by the third communication module, of a wireless connection signal, to establish a wireless connection with the second communication module;

emission by the mobile terminal of a signal for setting the at least actuator.

According to one implementation, this aspect of the invention comprises one or more of the following features, alone or in a technically feasible combination.

According to one implementation, the mobile terminal may comprise a software application configured to manage the communication with the second communication module.

According to these arrangements, the mobile terminal is adapted to determine whether the second communication module of an actuator is active, thanks to the reception of the activity signal emitted by the actuator.

According to one implementation, the at least one actuator comprises at least two actuators, the method comprising the following step:

selection on the mobile terminal of an actuator amongst the at least two actuators.

According to one implementation, the selection step comprises a substep of selecting an actuator from amongst the at least two actuators, the actuator being selected if the second communication module of said actuator is active.

According to one implementation, the selection step comprises a substep of successive control of each of the actuators of the at least two actuators in order to select the actuator with which a wireless connection is established at the step of transmitting a wireless connection signal.

According to one implementation, the selection substep comprises a visual identification of the actuator among the actuator or actuators successively set in motion by the successive control of each of the actuators 1.

According to one implementation, the selection step comprises a step of classifying the actuators of the at least two actuators according to an actuator proximity indicator, the proximity indicator being determined by the third communication module of the mobile terminal with the second communication module of each actuator of the at least two actuators.

According to another aspect, the invention also concerns an actuator configured to receive a command from a mobile terminal, the actuator comprising a first wired communication module, the first wired communication module being configured to communicate with a wired control unit via a wired network, the actuator comprising a second wireless communication module, the second communication module being configured to be active or inactive, the actuator being configured to emit, when the second communication module is active, an activity signal, the second active communication module being further configured to establish a wireless connection, with a mobile terminal provided with another wireless communication module, the second communication module being further configured, when the wireless connection with the mobile terminal is established, to receive, from the mobile terminal, an actuator setting signal.

According to one embodiment, this other aspect of the invention comprises one or more of the following features, alone or in a technically feasible combination.

According to one embodiment, the actuator further comprises a switch connected to the second communication module, the second communication module being configured, when it is inactive, to receive a wake-up signal and to be active after reception of said wake-up signal, said wake-up signal being received following an action on the switch.

According to still another aspect, the invention also concerns a mobile terminal configured to control an actuator, the actuator comprising a wireless communication module, the communication module being configured to be active or inactive, the actuator being configured to emit an activity signal when the communication module is active, the mobile terminal being configured to receive the activity signal and to establish a wireless connection with the wireless communication module, and when the wireless connection with the communication module is established, to emit an actuator setting signal.

According to a last aspect, the invention also concerns a set comprising at least one actuator according to any of the above-described embodiments, and a mobile terminal according to the above-described embodiment.

BRIEF DESCRIPTION OF THE DRAWINGS

For the proper understanding thereof, an embodiment and/or implementation of the invention is described with reference to the appended drawings representing, as a non-limiting example, an embodiment or implementation respectively of a device and/or of a method according to the invention. Similar references in the drawings refer to similar elements or elements whose functions are similar.

DETAILED DESCRIPTION

There are many buildings equipped with controllable electrical equipment intended to provide comfort and energy management functions, such as heating, ventilation and air-conditioning, but also lighting management and door leaves control, such as shades or rolling shutters placed in front the windows of the building or still remote security by controlling closure systems (doors, latches). Automation controls are the sets of rules that govern the control of the electrical equipment by a programmable supervision system, in order to ensure better comfort for the occupants of the building or to optimize energy consumption. These automation controls are designated by the term "Technical Building Management" or, more generally, by the expression "Building Automation Systems". In the residential sector, automation controls are most often referred to by the term "home automation". To simplify, hereinafter, the term home automation will be used to refer to both residential and tertiary applications.

Typically, the equipment of the same building is connected to a control unit, which has the function of supervising this equipment and controlling its operation. This connection is often achieved by connecting the equipment by dedicated wired links. For example, each device is connected directly to the control unit by means of one or several cable(s), in a master/slave configuration.

Figure 1:
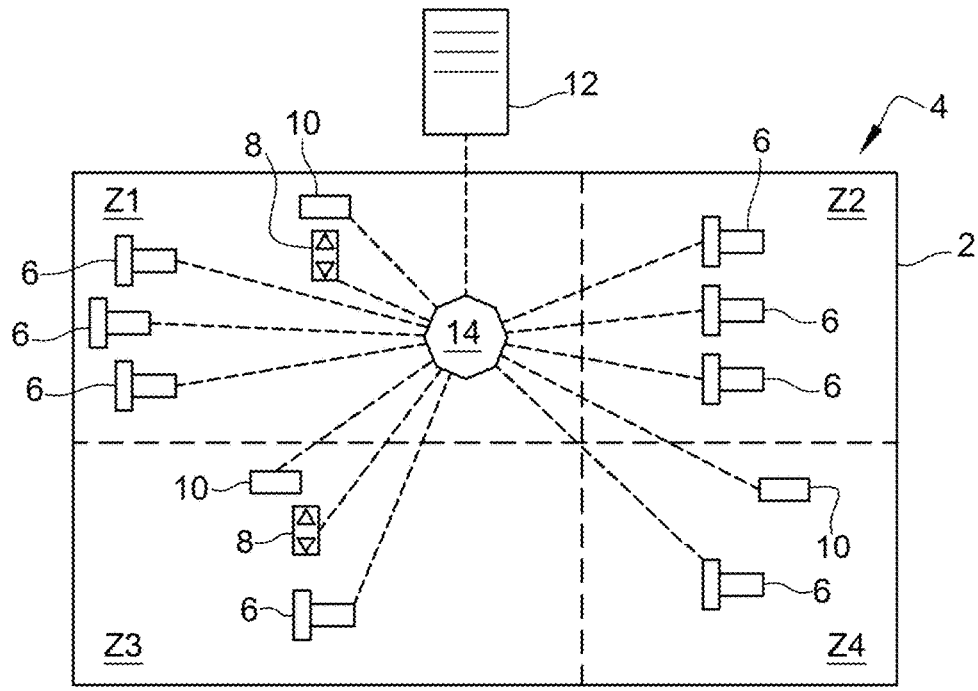
FIG. 1 is a simplified representation of a home automation installation.

FIG. 1 represents a building 2, comprising several areas Z1, Z2, Z3, Z4. The building 2 is equipped with a home automation system 4 which include a set of home automation equipment distributed in the areas of the building 2, as well as a system for controlling these home automation equipment.

The home automation system 4 is herein intended to provide comfort and energy management functions for the building 2, such as heating, ventilation and air-conditioning, as well as lighting management and door leaves control, such as shades or rolling shutters placed in front the windows of building 2 and/or security functions such as premises surveillance and alarm.

The set of home automation equipment comprises home automation equipment such as controllable home automation devices 6, control points 8 and sensors 10, adapted to implement the above functions.

The control system includes in particular a programmable control unit 12 and a communication network 14, internal to the building 2, in particular a wired communication network, the communication network 14 being arranged so as to enable the communication of the home automation equipment of the home automation system 4 with one another and with the control unit 12. Next, the home automation equipment of the home automation system 4 which is connected to this communication network 14 is said to belong to the communication network 14.

The home automation equipment and the control system are herein connected to one or several electrical power source(s), not illustrated, of the building 2.

The areas of the building 2 correspond to portions of the building 2 which are located inside and/or outside this building and each of which is intended to receive part of the home automation equipment of the home automation system 4.

The building 2 may consist of an office complex, or a residential building, or a commercial or industrial building, or any combination of these uses. It may in particular be a building or an individual house.

Thus, within the meaning of the present description, the term "home automation" is not limited to purely domestic and residential use.

For example, areas of building 2 correspond to levels of building 2, such as floors or basements. These areas may also be rooms, groups of rooms of the building 2, possibly separated from each other by partitions, these rooms could be distributed within one or several level(s) of the building 2.

These areas may be delimited independently of the physical structure of building 2. For example, the same room of the building 2 may have several areas. Such areas may also be located outside the building 2, for example when they correspond to a facade or a portion of the facade of the building 2. These areas may also correspond to facades or facade portions such as a facade portion corresponding to the same floor.

For example, these areas are defined during the design of the building 2 and/or during the design and/or the installation of the home automation system 4.

Preferably, the areas of the building 2 are distinct from each other. Nonetheless, alternatively, areas of the building 2 could overlap and/or be nested with one another.

In this example, only four areas, herein denoted Z1, Z2, Z3 and Z4, are defined with reference to the building 2. Nonetheless, in practice, this number may be different. In particular, it is adapted according to the configuration of the building 2 and the functions of the home automation system 4.

To simplify FIG. 1, the areas Z1, Z2, Z3 and Z4 are schematically illustrated inside the same floor of the building 2.

Preferably, each controllable home automation device 6 includes an actuator that can be controlled by means of at least one control signal.

Home automation devices 6 are herein illustrated identically. Nonetheless, they may differ from each other and ensure different functions within the home automation system 4.

For example, the actuator of the device 6 comprises an electric motor, the actuator acting on a mechanical load and arranged to displace and/or set an element of the building 2.

According to one example, the mechanical load of the device 6 is a blackout shutter, such as a panel, a shade or an opaque curtain, associated with at least one opening of the building 2, such as a window or a bay window. The displacement of this blackout shutter allows regulating the amount of sunlight received by the building 2 throughout this opening.

According to another example, the mechanical load of the device 6 is a compressor adapted to implement an expansion-compression cycle of a heat-transfer fluid within a refrigeration system of the building 2, such as an air-conditioner or a heat pump, in order to regulate the temperature inside the building 2.

According to still another example, the mechanical load of the device 6 is a pump or a fan intended to set in motion a volume of fluid within the building 2, for example to suck in or blow air within a ventilation system, or to make water or a heat-transfer fluid circulate within a dedicated pipe. The mechanical load of the device may also be a heater.

The actuator of the controllable home automation device 6 for heating or air-conditioning functions is for example a thermostatic valve.

Alternatively, the actuator of the device 6 can control an electrical switching device, in order to control the switching on and off of a light source, such as a neon or light-emitting diode lamp, within the building 2.

The controllable home automation device 6 may also be lighting, for example, interior or exterior lighting or a lighting control system, an alarm system, or still a video camera, in particular a video-surveillance camera.

A control point 8 is intended to receive control instructions from a user of the building 2, in order to control, directly or indirectly, one or more of the controllable home automation devices 6 and/or to control the control unit 12.

To this end, each control point 8 includes herein a human-machine interface, not illustrated, comprising data entry means, such as one or several switch(es) and/or one or several pushbutton(s) and/or one or several rotary knob(s) and/or a touchscreen. The control point 8 can also include a connection interface for connecting external control means thereto, for example one or several individual switch(es) disposed around the control point 8 and being connected by a wired link to the latter.

The human-machine interface of the control point 8 may also include display means, such as indicator lights and/or an electronic screen, for example a liquid crystal one, to display, to the user, information relating to the operation of the home automation system 4 or to instructions entered on said human-machine interface.

The control points 8 may be in the form of a portable remote-control associated with a fixed receiver or, alternatively, of a fixed control terminal secured to a wall of the building 2.

Herein again, the control points 8 are illustrated identically herein, but they could differ from one another and ensure different functions within the home automation system 4.

A sensor 10 is intended to convert one or several physical quantit(y/ies) relating to the state of the building 2 or of its environment into one or several signal(s) proportional to this physical quantity. For example, this signal is an electrical signal, a light signal or a radiofrequency signal. This signal may be transmitted by the sensor to at least one home automation piece of equipment and/or the control system, for example, the control unit 12.

One or several sensor(s) 10 may be integrated into a controllable home automation device 6, into a control point 8 or still into the control unit 12. The home automation installation 4 may also include one or several sensor(s) independent of these elements.

For example, the physical quantities measured by the sensors 10 are, without limitation, a temperature, for example a temperature of a wall or of the ambient air, a humidity level, a value of luminosity, of light intensity or luminance, or a pressure of the ambient air, a wind speed and/or direction, a consumption value for example of water, gas or electricity, the opening state of a rolling shutter, the position of a door leaf such as a window, whether motor-driven or not, or still the presence or the absence of a user.

Herein again, the sensors 10 are illustrated herein identically but could have differences from each other within the home automation system 4.

In general, each home automation device comprises a network interface 40, which enables it to communicate on the network 14.

As an illustrative example, in FIG. 1, the area Z1 comprises three home automation devices 6, a control point 8 and a sensor 10. The area Z2 includes three home automation devices 6. The area Z3 includes a home automation device 6, a control point 8 and a sensor 10. The area Z4 includes a home automation device 6 and a sensor 10.

For example, the three controllable home automation devices 6 of the area Z2 are adapted to displace blackout shutters equipping openings of the building 2 arranged at the level of this area Z2. Still in this example, the home automation devices 6 of the area Z1 herein form part of an air-conditioning and refrigeration system for the air circulating in the area Z1. Their operation is regulated, by means of controllable thermostatic valves, as a function of control commands received by the control point 8 and as a function of a temperature measured by the sensor 10 located in this area Z1.

Each home automation equipment of the home automation system 4, including in particular the controllable home automation devices 6, the control points 8 and the sensors 10, is connected to the control unit 12 through the communications network 14 and to this end includes a network interface, described hereinafter, to connect to this communications network 14. The control unit 12 also includes a network interface not represented in FIG. 1.

For example, each home automation device 6 receives control signals through the communications network 14.

Each control point 8 transmits the control instructions received through the communications network 14. Each sensor 10 sends the measured information through the communication network 14.

The communication is performed according to a given communication protocol.

This communication is herein performed by an exchange of messages, for example in the form of packets, each of these messages containing at least one header, which includes a destination of the message, and useful data, such as a command order or a value of a physical quantity measured by a sensor. The communication protocol on the communication network 14 may be unidirectional or bidirectional.

Figure 2:
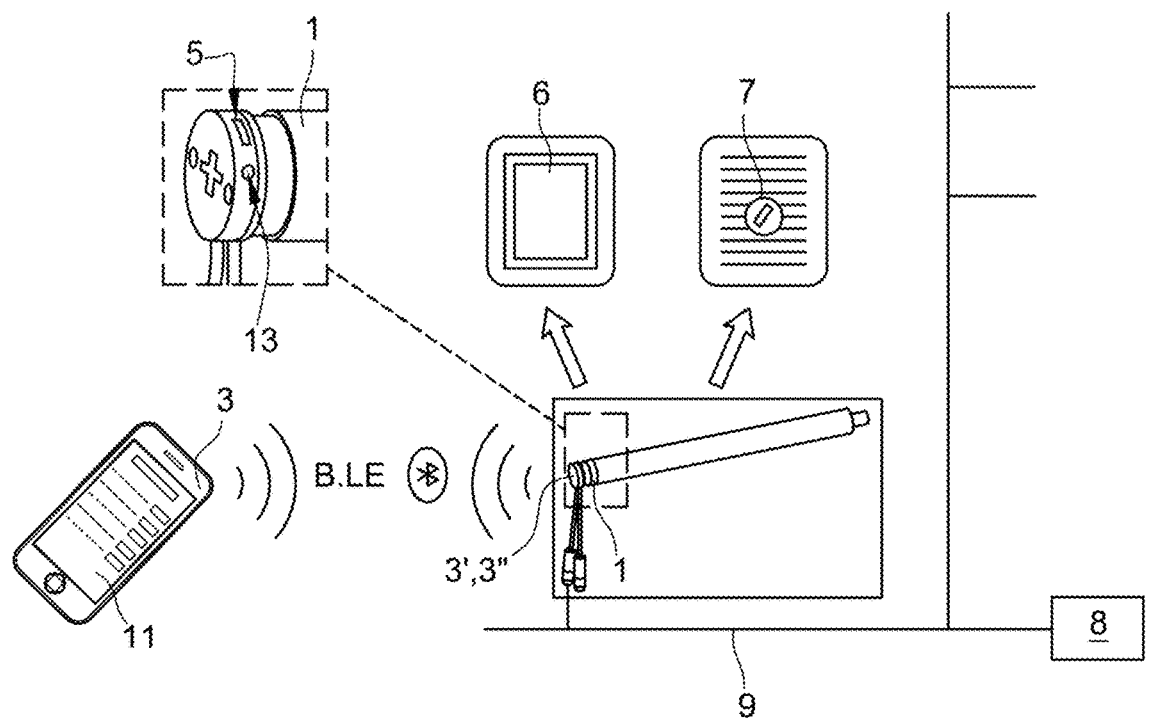
FIG. 2 is a simplified representation of the device.

According to one embodiment, represented in FIG. 2, the method according to the invention is configured to control the setting of one or more of the actuators 1 of the home automation devices 6 of the home automation system 4. Each actuator 1 is configured to receive control and/or setting signals and execute the corresponding commands or settings.

A control or setting signal may be received at the level of the network interface of an actuator 1. This network interface comprises a first wired communication module 3'; thus each actuator 1 is connected via said first wired communication module 3' and the wired communication network 14 to a wired control unit 8. The wired control unit 8 is configured to emit signals for controlling or setting the different actuators 1 via the wired communication network 14 and the first wired communication module 3' of each actuator 1.

To receive control or setting signals, each actuator 1 also comprises a second wireless communication module 3".

The second wireless communication module 3" of each actuator is configured to be either in a so-called active mode or in a so-called inactive mode; when the second wireless communication module 3" is in the active mode, the second communication module wireless 3" is subjected to alternations of short standby and wake-up periods, in the range of a few milliseconds for example.

At the same time, the first wired communication module 3' of each actuator is configured to be in a so-called active mode in which it is subjected to alternations of short standby and of wake-up periods in the range of a few milliseconds for example.

In the inactive mode, the second wireless communication module 3" may be completely disconnected as long as it does not receive a wake-up signal. The first wired communication module 3' remains active, regardless of the state of the second wireless communication module 3"; when the second wireless communication module 3" is inactive, the second wireless communication module 3" is configured to receive a wake-up signal and to become active after reception of said wake-up signal.

Said wake-up signal may be emitted by a switch 5 of the actuator 1, for example following a mechanical action on the switch 5, such as a press on a button of the switch 5.

Said wake-up signal may also be emitted by the wired control unit 8, for example following an action on the wired control unit 8 or following an action on another element of the wired communication network 14, such as for example a configuration tool, not represented in the figure, provided with a network interface for its connection to the communication network 14 and connected to the wired communication network 14.

When the second communication module 3" is active, the actuator 1 is configured to emit an activity signal 13 indicating that a wireless link is available, and to establish a wireless connection with a mobile terminal 11, via the wireless communication module 3 of the mobile terminal 11. The mobile terminal 11 may be a smart telephone (or smartphone), a tablet or a laptop.

The activity signal may be a signal emitted by the second communication module 3" at least during its switch into the active state. The activity signal may also comprise a first activity signal perceptible by a user and indicating that the second communication module 3" is active and a second activity signal transmitted by the user to the mobile terminal, in particular by means of a human-machine interface of the mobile terminal.

The second communication module 3" of the actuator 1 is further configured to receive, when the wireless connection with the mobile terminal 11 is established, a signal for setting the at least one actuator 1, originating from the mobile terminal 11.

According to these arrangements, it is possible for authorized users having a mobile terminal 11 configured to establish a wireless connection with the actuator 1, to transmit to the actuator 1, wirelessly and without any physical intervention at the level of the actuator 1, setting signals, and to reserve the wired control unit 8, which is more secure since it is connected to the communication network, for sending, by ordinary users, the usual signals for controlling the actuators 1. To the extent that the wireless connection is activated only on special request, by a user having access to the communication network, it is not necessary to add additional security functions, such for example as a password, to secure the use of the wireless connection.

According to one aspect, the invention concerns an actuator 1, or a mobile terminal 11, configured according to the description hereinbefore. According to another aspect, the invention also concerns a set comprising an actuator 1 and a mobile terminal, configured according to the description hereinbefore.

Figure 3:
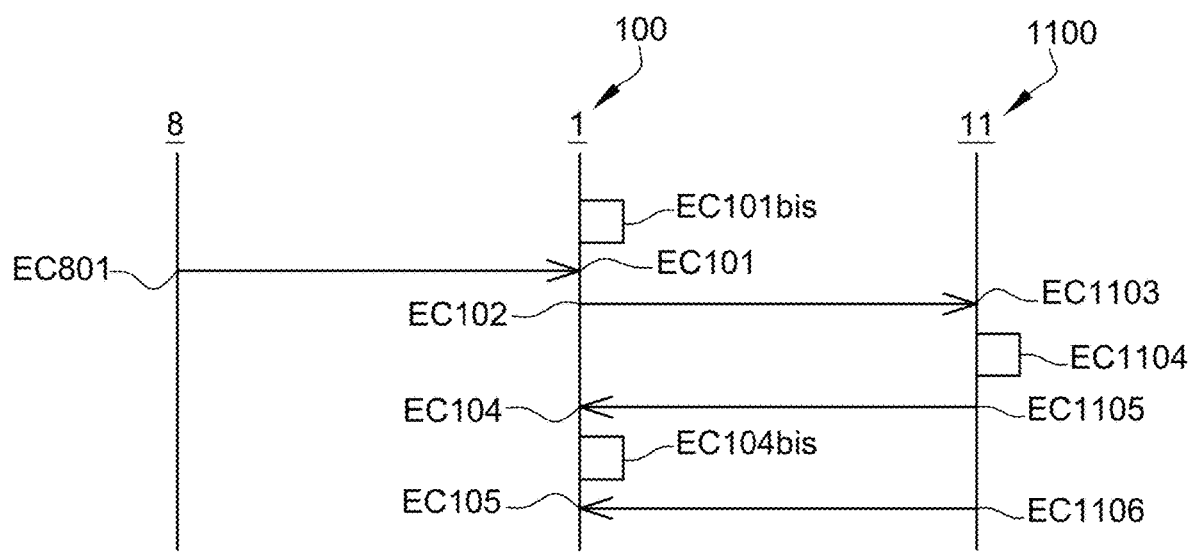
FIG. 3 is a schematic representation of the steps of the method according to the invention.

The invention also concerns a method 100 for controlling one or several actuator(s) 1, the actuator(s) 1 being connected via a wired network 14 to a wired control unit 8 configured to emit control or setting signals intended for the actuator(s) 1, the actuator(s) 1 comprising a first wired communication module 3' and a second wireless communication module 3", the second wireless communication module 3" being configured to be active or inactive, and a switch 5, connected to the second wireless communication module 3", the method 100 comprising the following steps implemented by the actuator(s) 1, as schematically represented in FIG. 3:

if the second wireless communication module 3" is inactive, wake-up of the second communication module 3", triggered by the reception EC101 of a wake-up signal emitted following an action EC101bis, EC801 on the switch 5 or on the wired control unit 8, or by an action on another element of the wired communication network 14, such as for example a configuration tool provided with a network interface for its connection to the communication network 14 and connected to the wired communication network 14;

emission EC102 by the actuator(s) 1 of an activity signal 13 of the wireless link;

establishment EC104bis of a wireless connection with a mobile terminal 11, the mobile terminal comprising another wireless communication module 3, following a reception EC104 by the second wireless communication module 3" of a connection signal emitted by the other wireless communication module 3 of the mobile terminal 11;

reception EC105 of a signal for setting the actuator(s) 1 originating from the mobile terminal 11.

The method may comprise a step of disconnecting the wireless connection, and a step of deactivating the second wireless communication module 3", said deactivation corresponding to the switch from an active mode into a deep standby mode; said deactivation being triggered preferably automatically after a predetermined time from the disconnection, or by a deactivation signal emitted by the mobile terminal 11, or by the wired control unit 8 or by the configuration tool connected to the wired communication network 14.

The invention further concerns a method 1100 for controlling one or several actuator(s) 1, the method 1100 comprising the following steps implemented by the mobile terminal 11 as schematically illustrated in FIG. 3:

reception EC1103, by the communication module 3 of the mobile terminal 11, of an activity signal 13 of a wireless link, emitted by the actuator(s) 1 including the second wireless communication module 3" is active;

transmission EC1105 by the communication module 3 of the mobile terminal, of a wireless connection signal, to establish a wireless connection with the second communication module 3" of the actuator(s) 1;

transmission EC1106 by the mobile terminal 11 of a signal for setting the at least actuator 1.

When there are at least two actuators 1, the method 1100 may comprise a step of selecting EC1104, by an action on the mobile terminal 11, of an actuator 1 amongst the at least two actuators, for example in a list of actuators 1 whose wireless communication module has been identified by the mobile terminal as active, following the reception EC1103 of an activity signal 13 originating from the actuator(s) of said list.

The selection step EC1104 may comprise a successive control of each of the actuators 1 to identify the actuator 1 with which a wireless connection is then established, the identification may be visual, for example, if the successive control of each of the actuators 1 has the effect of successively setting each of the actuators 1 in motion.

The selection step EC1104 may also comprise a step of classifying the actuators according to an actuator proximity indicator, the proximity indicator being determined by the communication module 3 of the mobile terminal 11 with the second wireless communication module 3" of each actuator, the selection of an actuator 1 then being carried out based on the classification of the actuators 1, for example by selecting the closest one.

The invention claimed is:

1. A method for controlling at least one actuator, the at least one actuator being connected via a wired network to a wired control unit configured to emit control, or setting, or wake-up signals intended for the at least one actuator, the at least one actuator comprising a first wired communication module, the first wired communication module being configured to communicate with the wired control unit via the wired network, the at least one actuator comprising a second wireless communication module, the second wireless communication module being configured to be active or inactive, and a switch, connected to the second communication module, the method comprising the following steps implemented by the at least one actuator:

if the second communication module is inactive, activation of the second wireless communication module triggered by reception of a wake-up signal emitted following an action on the switch or on the wired control unit or on another element of the wired communication network, such as a configuration tool, provided with a network interface for its connection to the communication network and connected to the wired communication network, emission by the at least one actuator of an activity signal;

reception by the second communication module of a connection signal received from a third communication module of a mobile terminal;

establishment of a wireless connection with the mobile terminal; and reception of a signal for setting the at least one actuator originating from the mobile terminal.

2. The method according to claim 1, wherein the action on the wired control unit is exerted directly on the wired control unit, or results from an action on another element of the wired communication network configured to communicate with the wired control unit.

3. A method for controlling at least one actuator, the at least one actuator being connected via a wired network to a wired control unit configured to emit control or setting signals or wake-up signals intended for the at least one actuator, the at least one actuator comprising a first wired communication module, the first wired communication module being configured to communicate with the wired control unit via the wired network, the at least one actuator comprising a second wireless communication module, the second wireless communication module being configured to be active or inactive, and a switch connected to the second wireless communication module, the method comprising the following steps implemented by a mobile terminal comprising a third communication module, the third communication module being a wireless communication module:

reception, by the third communication module of the mobile terminal, of an activity signal emitted by the at least one actuator whose the second wireless communication module is active;

emission by the third communication module, of a wireless connection signal, to establish a wireless connection with the second wireless communication module; and emission by the mobile terminal of a signal for setting the at least one actuator.

4. The method according to claim 3, wherein the at least one actuator comprises at least two actuators, the method comprising the following step:

selection on the mobile terminal of an actuator amongst the at least two actuators.

5. The method according to claim 4, wherein the selection step comprises a substep of selecting an actuator from amongst the at least two actuators, the actuator being selected if the second wireless communication module of said actuator is active.

6. The method according to claim 4, wherein the selection step comprises a substep of successive control of each actuator of the at least two actuators in order to select the actuator amongst the at least two actuators with which a wireless connection is established at the step of emission of the wireless connection signal.

7. The method according to claim 4, wherein the selection step comprises a step of classifying each actuator of the at least two actuators according to an actuator proximity indicator, the proximity indicator being determined by the third communication module of the mobile terminal with the second wireless communication module of each actuator of the at least two actuators.

8. An actuator configured to receive a command from a mobile terminal, the actuator comprising a first wired communication module, the first wired communication module being configured to communicate with a wired control unit via a wired network, the actuator comprising a second wireless communication module, the second wireless communication module being configured to be active or inactive, the actuator being configured to emit, when the second wireless communication module is active, an activity signal, the second wireless communication module when active being further configured to establish a wireless connection, with a mobile terminal provided with another wireless communication module, the second communication module being further configured, when the wireless connection with the mobile terminal is established, to receive, from the mobile terminal, an actuator setting signal.

9. The actuator according to claim 8, the actuator further comprising a switch connected to the second wireless communication module, the second wireless communication module being configured, when it is inactive, to receive a wake-up signal and to be active after reception of said wake-up signal, said wake-up signal being received following an action on the switch.

10. A mobile terminal configured to control an actuator, the actuator comprising a wireless communication module, the wireless communication module being configured to be active or inactive, the actuator being configured to emit an activity signal when the wireless communication module is active, the mobile terminal being configured to receive the activity signal and to establish a wireless connection with the wireless communication module, and when the wireless connection with the wireless communication module is established, to emit an actuator setting signal.

* * * * *